(12) United States Patent
Noble

(10) Patent No.: US 11,591,051 B1
(45) Date of Patent: Feb. 28, 2023

(54) TENDON SUPPORT BUOYANCY SYSTEM AND METHOD

(71) Applicant: NuEnergy Partners, LP, Beaumont, TX (US)

(72) Inventor: Thomas H. Noble, Beaumont, TX (US)

( * ) Notice: Subject to any disclaimer, the term of this patent is extended or adjusted under 35 U.S.C. 154(b) by 67 days.

(21) Appl. No.: 17/102,014

(22) Filed: Nov. 23, 2020

Related U.S. Application Data

(60) Provisional application No. 62/938,743, filed on Nov. 21, 2019.

(51) Int. Cl.
| | |
|---|---|
| *B63B 39/00* | (2006.01) |
| *B63B 13/00* | (2006.01) |
| *B63B 79/40* | (2020.01) |
| *G05D 1/00* | (2006.01) |

(52) U.S. Cl.
CPC .............. *B63B 39/00* (2013.01); *B63B 13/00* (2013.01); *B63B 79/40* (2020.01); *G05D 1/0011* (2013.01)

(58) Field of Classification Search
CPC ......... B63B 39/00; B63B 79/40; B63B 13/00; B63B 35/00; B63B 35/44; B63B 3/00; B63B 3/06; B63B 5/00; B63B 5/20; B63B 5/22; B63B 43/00; B63B 43/06; G05D 1/0011; E02B 17/00

USPC .................................................. 114/264, 267
See application file for complete search history.

(56) References Cited

U.S. PATENT DOCUMENTS

| | | | |
|---|---|---|---|
| 6,884,003 B2 * | 4/2005 | Horton, III | ......... B63B 35/4413 405/224.2 |
| 10,518,849 B2 * | 12/2019 | Lim | ....................... B63B 35/44 |
| 2004/0028479 A1 | 2/2004 | Horton, III | |
| 2004/0052586 A1 | 3/2004 | Horton, III | |
| 2004/0161984 A1 | 8/2004 | Lima de Almeida et al. | |
| 2004/0253059 A1 | 12/2004 | Horton, III | |
| 2007/0212170 A1 | 9/2007 | Hawley | |
| 2011/0083853 A1 | 4/2011 | Pionetti | |
| 2015/0075417 A1 | 3/2015 | Khachaturian | |
| 2019/0078556 A1 | 3/2019 | Stiesdal | |

* cited by examiner

*Primary Examiner* — Lars A Olson
(74) *Attorney, Agent, or Firm* — Bushman Werner, P.C.

(57) ABSTRACT

A multi-tank/vessel buoyancy system for use in deploying and connecting tendons or other elongate members between subsea anchors and floating/semi-submersible platforms. The vessels are interconnected at axially spaced locations toward their upper ends and lower ends, there being an equalizing system proximate the top ends of the vessels to permit ingress and egress of air into the vessels and a lower water equalizing system to permit free-flowing ingress and egress of water into the vessels. There is at least one clamping system operatively connected to the multi-vessel system, the clamping system, like the valving systems, being remotely, acoustically operable from a PLC on a work barge or the like.

20 Claims, 5 Drawing Sheets

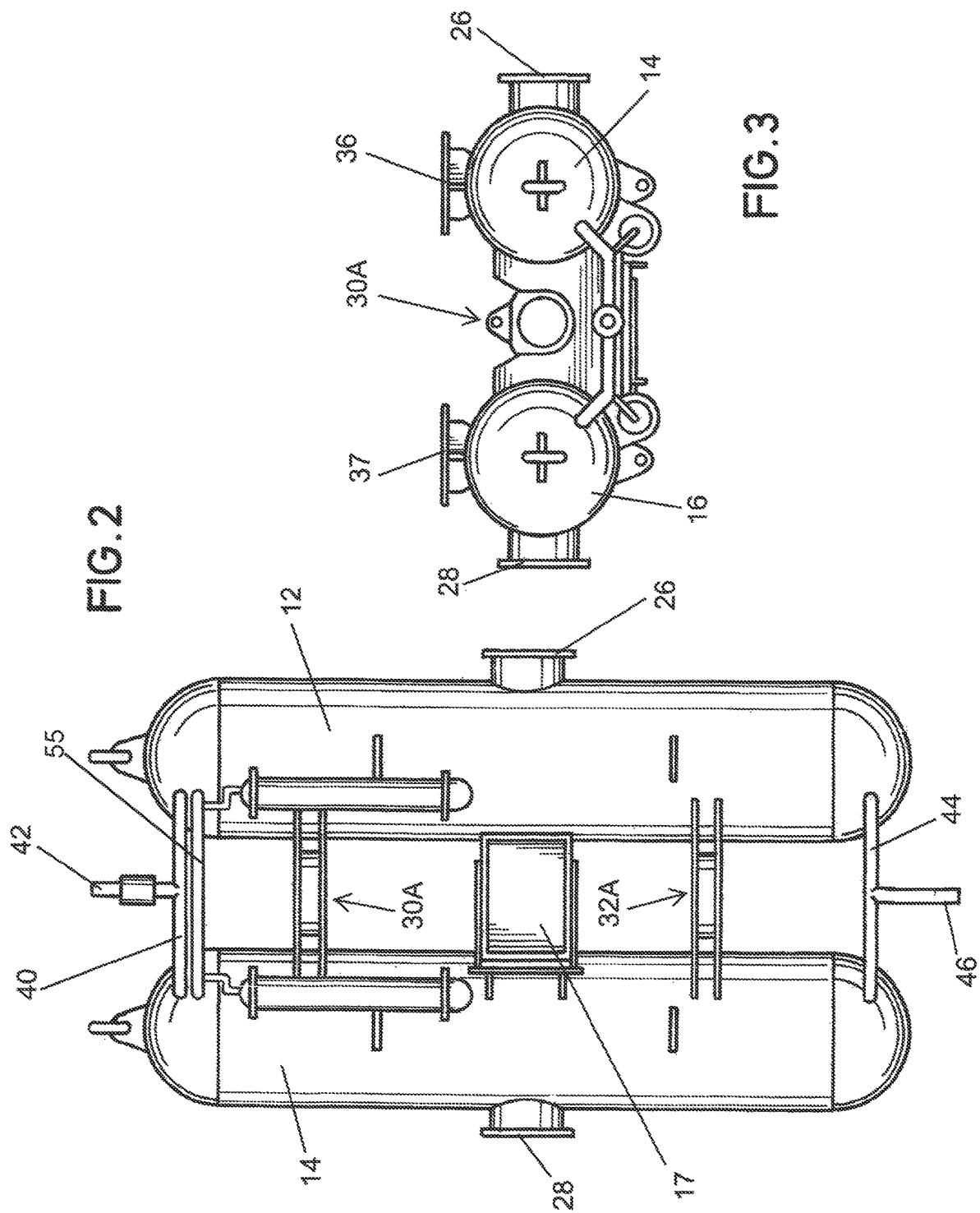

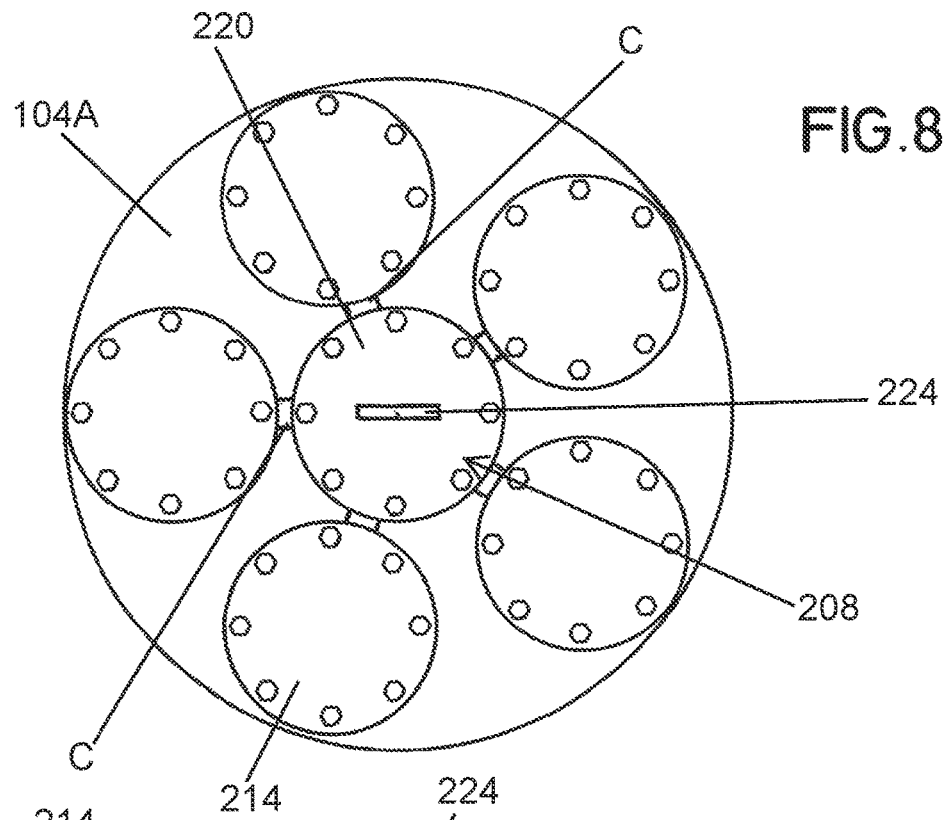
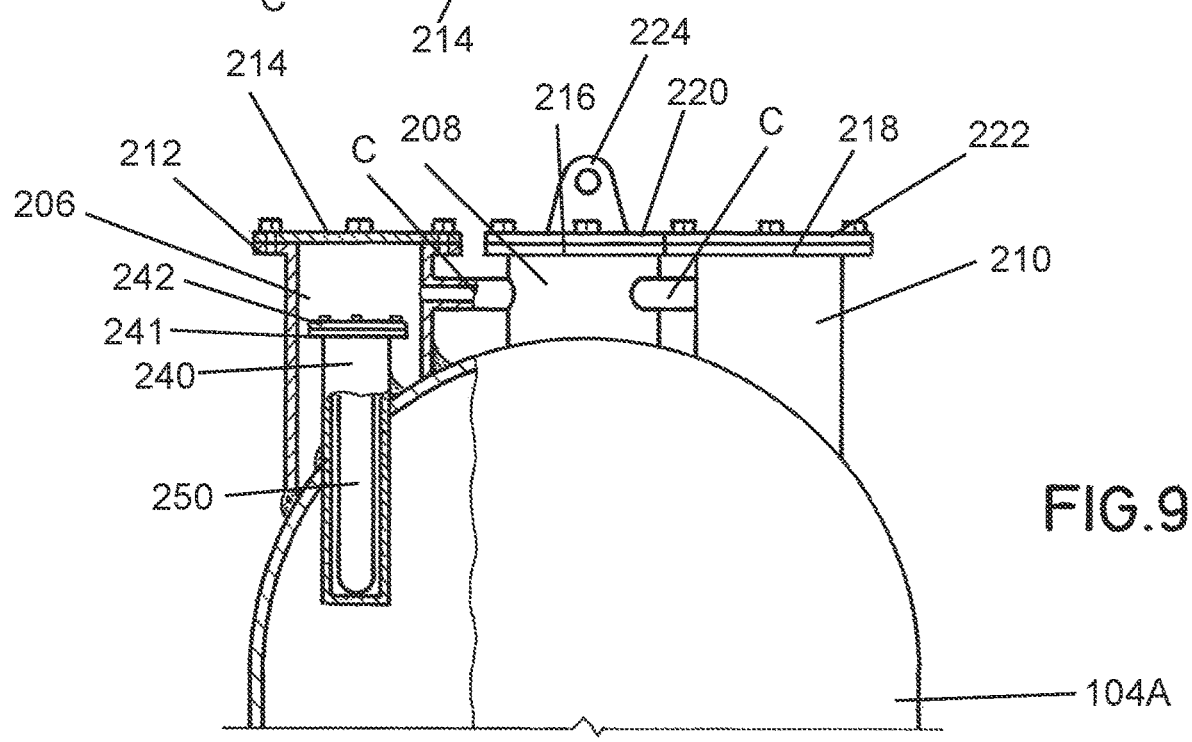

TENDON SUPPORT BUOYANCY SYSTEM AND METHOD

CROSS REFERENCE TO RELATED APPLICATION

This application claims priority to U.S. application Ser. No. 62/938,743 filed on Nov. 21, 2019, the disclosure of which is incorporated herein by reference for all purposes.

FIELD OF THE INVENTION

The present invention relates to offshore structures and, more particularly, to buoyancy support systems for tendons and other elongate members used with offshore platforms, particularly tension leg platforms for wind turbines.

BACKGROUND OF THE INVENTION

In an attempt to control climate change due to the use of fossil fuels, there is an increasing focus on renewable energy sources such as wind turbines. Initially wind turbine generators for producing electric power were largely on shore structures. At the present time, the vast majority of offshore energy generation (OEG) comes from platforms/wind turbines in shallow waters. This is no doubt due to the complexity of offshore, particularly deep water support structures, e.g., platforms and the like. Nonetheless, land based and shallow water based generation of electric power is becoming limited by space considerations. Accordingly, the technology is shifting toward developing turbine support structures which can be used in deeper offshore waters.

Current, floating turbine support systems fall generally into three categories —spar-buoy, semi-submersible, and tension leg platform (TLP). In the construction of TLPs, typically a semi-submerged buoyant structure is anchored to the sea bed with tension mooring lines, commonly referred to as tendons.

Tendons for use with offshore platform construction have been used for many years, particularly in the construction of offshore platforms for oil and gas exploration and production. A typical tendon support buoy (TSB) which has been used for many years is one designed by Detailed Design, Inc. These TSBs are generally made to accommodate tendons or pipe having diameters from 22 to 40 inches. Accordingly, the TSBs are large, e.g., from about 24 feet in diameter and 90 feet in length. There is presently a need for buoyancy systems, particularly TSBs, which can accommodate smaller diameter elongate members, e.g., tendons that have a diameter of between 8 to 20 inches. There is also a need for TSBs which greatly reduces the costly use of underwater or in the water activities involving equipment and labor such as remotely operated vehicles (ROVs) and divers.

SUMMARY OF THE INVENTION

In one aspect, the present invention relates to TSBs for use in the construction of platforms for offshore wind turbines.

In another aspect, the present invention relates to TSBs which can be used with tendons and other elongate mooring members having diameters ranging from about 8 to about 20 inches.

In a further aspect, the present invention relates to TSBs which can be remotely operated to incrementally regulate buoyancy.

In yet another aspect, the present invention relates to TSB systems and methods which greatly reduce the use of ROVs, divers, and other, "in the water" auxiliary equipment for installation of tendon mooring systems.

In even a further aspect, the present invention relates to a TSB which can be operated without the need for umbilical cords, cables, chains, etc. to navigate and control the operation of the TSB.

In still a further aspect, the present invention relates to a TSB which can generally be transported on regulated highways, i.e. with controlled width restrictions, generally 8 feet 5 inches and maximum overall lengths of 40 ft.

These and further features and advantages of the present invention will become apparent from the following detailed description, wherein reference is made to the figures in the accompanying drawings.

BRIEF DESCRIPTION OF THE DRAWINGS

FIG. 2 is a front, elevational view of the TSB shown in FIG. 1.

FIG. 3 is a top, plan view of the TSB shown in FIG. 1.

FIG. 8 is a top plan view of another embodiment of the TSB of the present invention.

FIG. 9 is a partial elevational view taken along the lines 9-9 of FIG. 8.

DETAILED DESCRIPTION OF PREFERRED EMBODIMENTS

Figure 1:
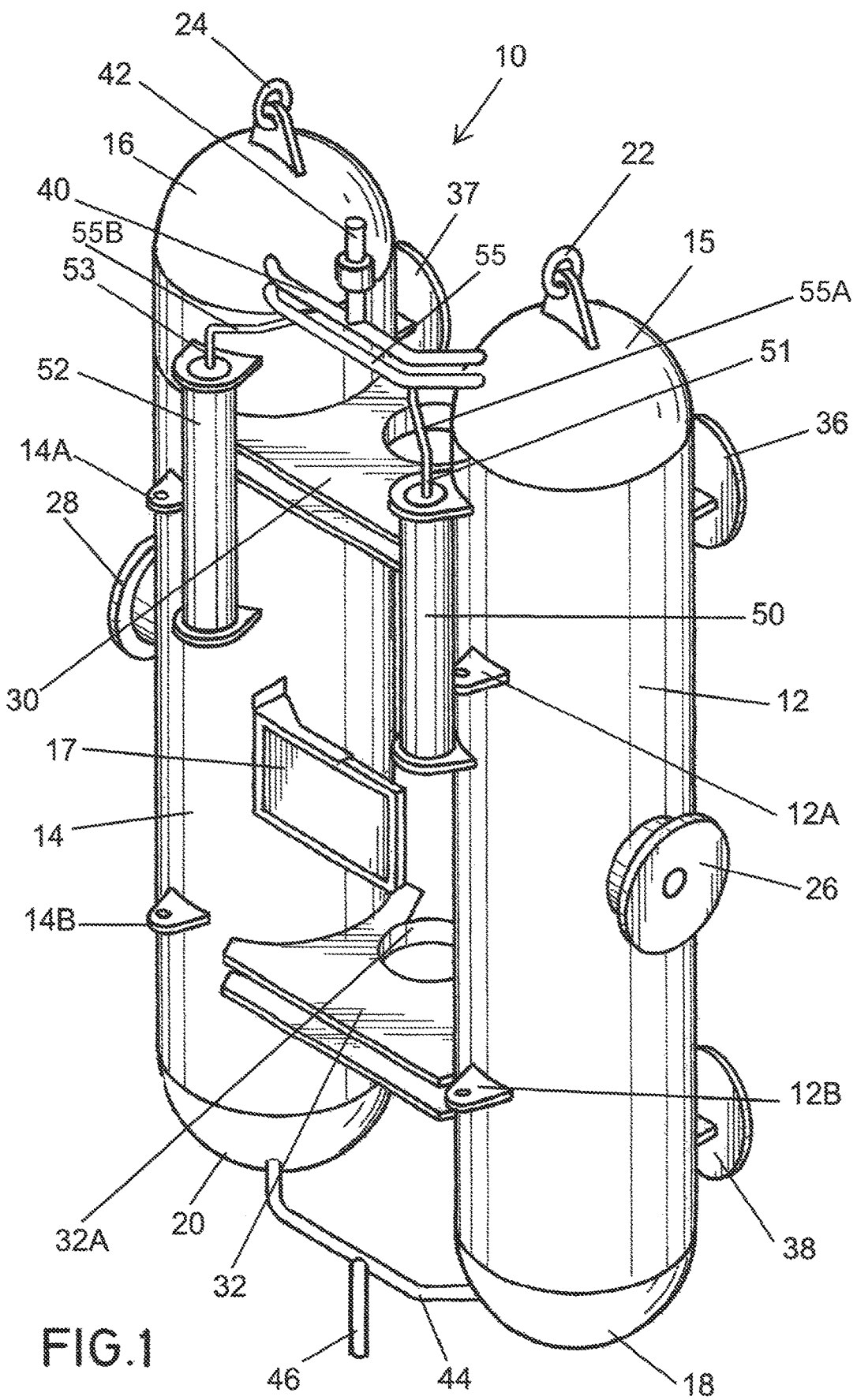
FIG. 1 is a perspective depiction of one embodiment of the TSB of the present invention.

Referring first to FIG. 1, there is shown a perspective view of one embodiment of the TSB of the present invention. The embodiment of FIG. 1, shown generally as 10 comprises first and second generally cylindrical vessels 12 and 14 having domed tops 15 and 16, respectively, and domed bottoms 18 and 20, respectively. The vessels 12 and 14 are provided with lifting pad eyes 22 and 24 as well as side pad eyes 12A and 12B on vessel 12, and 14A and 14B on vessel 14, the latter being used in handling and transferring the TSB. Vessels 12 and 14 have hatch covers 26 and 28 over manways allowing access to the interiors of the vessels 12 and 14 for servicing and maintenance when not in use.

There are upper and lower webs 30 and 32, respectively, which rigidly interconnect vessels 12 and 14. Web 30 carries a remotely operable clamping mechanism 30A while lower web 32 carries a remotely operable clamping mechanism 32A. The clamping mechanisms 30A and 32A are well known to those skilled in the art and generally comprise first and second pivoted jaws which can be hydraulically or pneumatically actuated, e.g., via piston cylinder actuators, to between an open and a closed position as desired.

Connected to vessel 12 are first and second spaced saddles 36 and 38, while vessel 14 has a similar pair of saddles, 37 and 39. The saddles allow the system 10 to rest on a flatbed truck, trailer or the like, or on a barge surface when being transported and/or being readied for service.

A conduit 40 interconnects and provides a path of open communication between vessel 12 and vessel 14 to provide equalization of air pressure in vessels 12 and 14. There is a remotely operated control valve, e.g., a solenoid operated valve 42 connected to conduit 40. Control valve 42 is operative to control venting of air from the vessels 12 and 14 via conduit 40.

There is a second conduit 44 providing a path of open communication between vessels 12 and 14 at their lower end, conduit 44 in conjunction with nozzle 46 serving to allow the free-flowing ingress and egress of water into and out of vessels 12 and 14.

There are two compressed air tanks 50 and 52, which provide a source of compressed air to help regulate buoyancy of vessels 12 and 14. The tanks 50 and 52 have remotely operable valves 51 and 53, respectively, and are operatively connected to conduit 55 via lines 55A and 55B to provide air pressure to the vessels 12 and 14.

Figure 5:
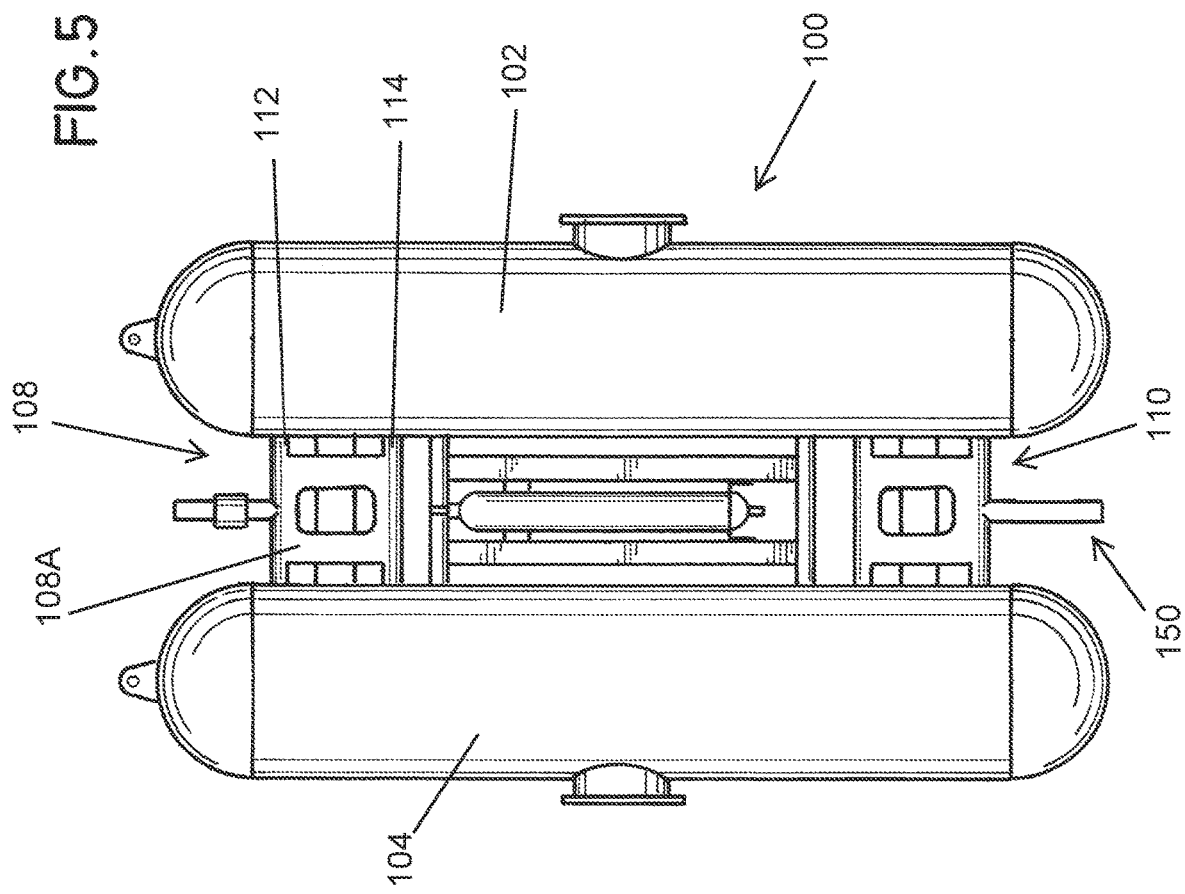
FIG. 5 is a side, elevational view of another embodiment of the TSB of the present invention.
Figure 4:
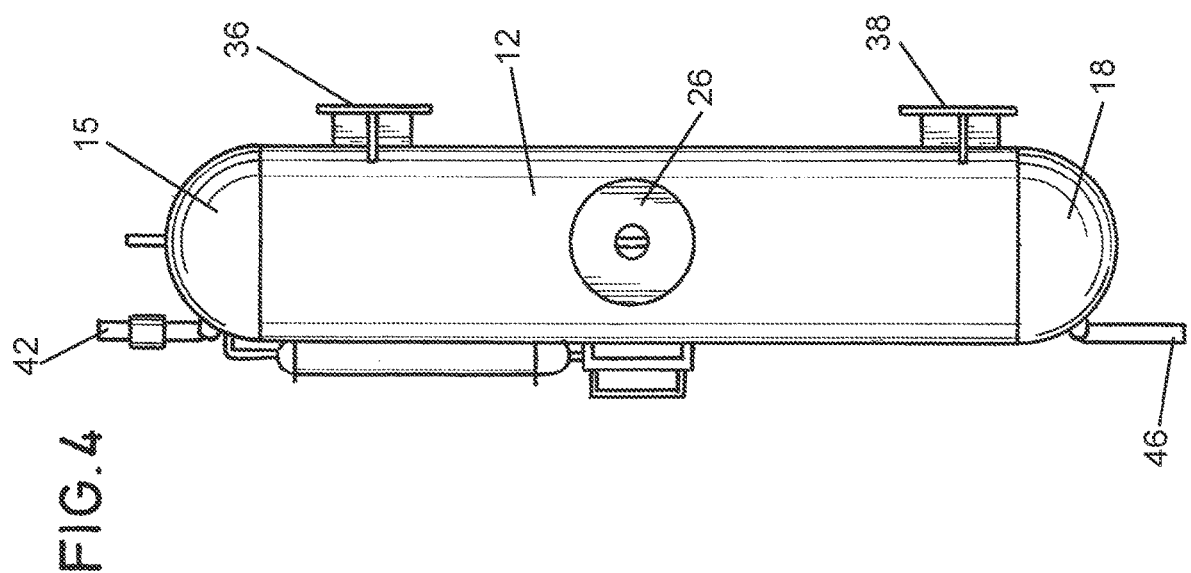
FIG. 4 is a side, elevational view of the TSB shown in FIG. 1.
Figure 7:
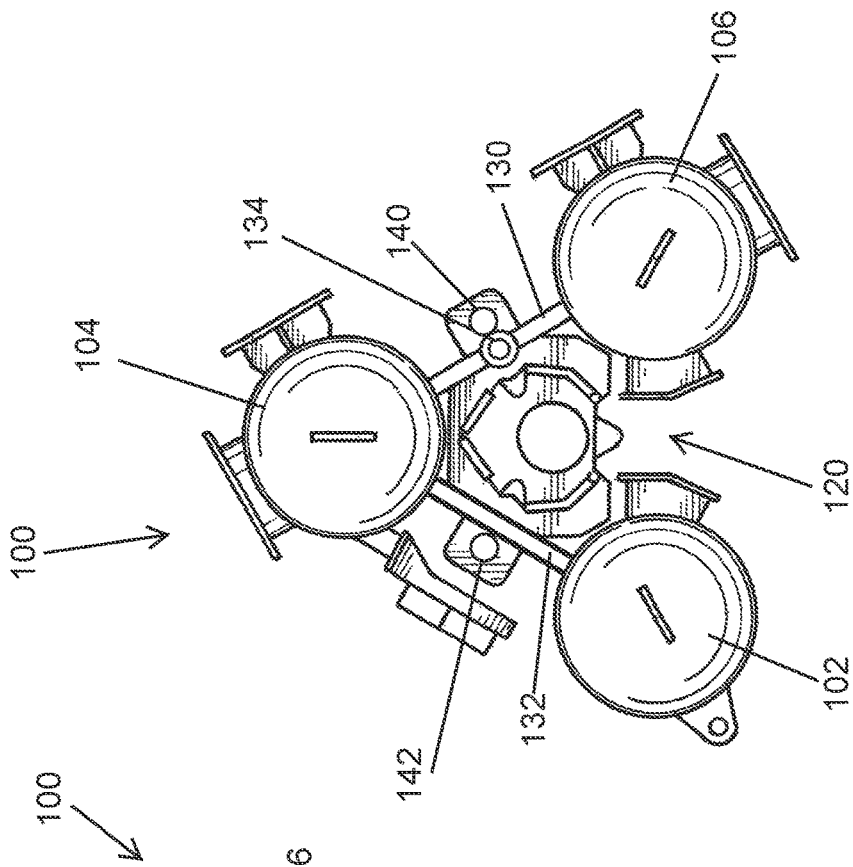
FIG. 7 is a top, plan view of the TSB shown in FIG. 5.
Figure 6:
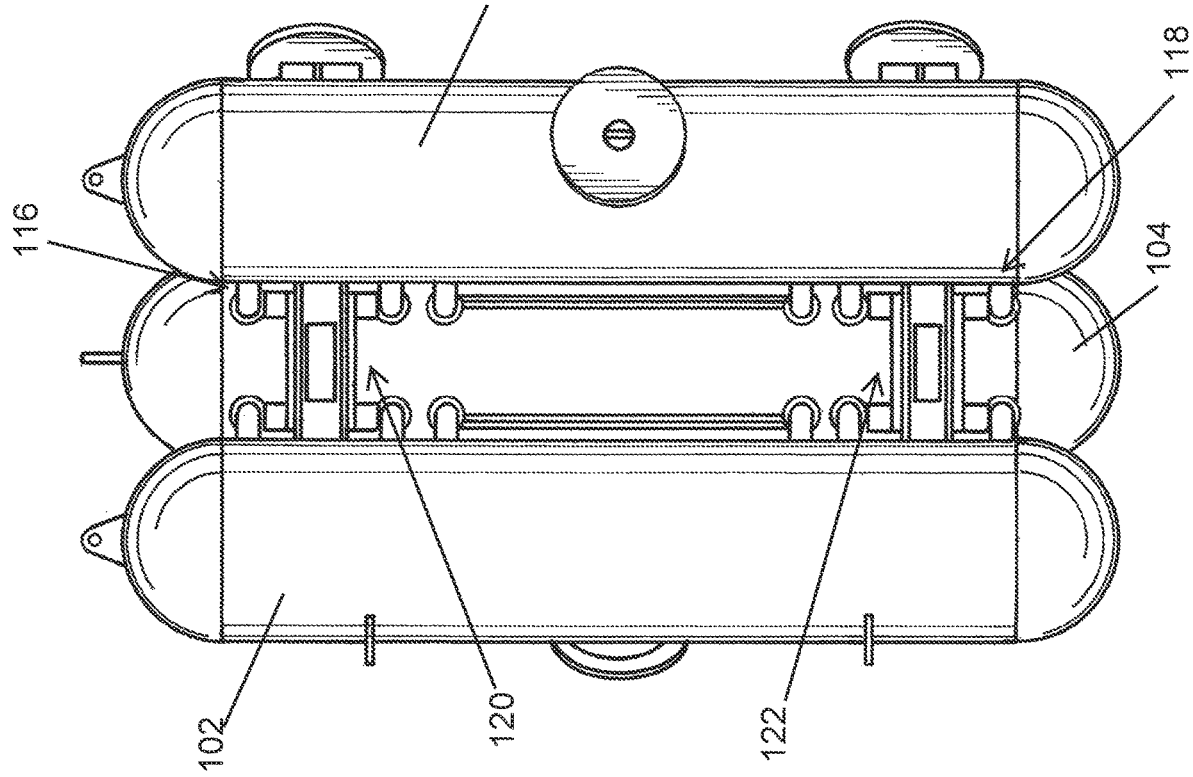
FIG. 6 is a side, elevational view of the TSB shown in FIG. 5.

There is a platform 17 connected to vessel 14 for maintenance workers. Referring now to FIGS. 5-7, there is shown another embodiment of the TSB of the present invention wherein three vessels are employed. The TSB of FIGS. 5-7 shown generally as 100 comprises first vessel 102, second vessel 104, and third vessel 106, the vessels 102-106 being the same as those being described above with respect to FIGS. 1-4, i.e., generally cylindrical in nature, having the same dimensional characteristics, and being connected such that their upper domed ends lie generally or approximately coplanar and their lower domed ends are generally or approximately coplanar.

Turning now to the embodiment of FIGS. 5-7, vessels 102 and 104 are interconnected adjacent to their upper ends by a rack 108, and adjacent their lower ends by a rack 110, racks 108 and 110 comprising axially spaced crossbars, e.g., crossbars 112 and 114 rigidly connected to tanks 102 and 104, there being a plate, e.g., plate 108A, connected to axially spaced crossbars 112 and 114. Rack 110 has a similar structure.

A second pair of racks 116 and 118, similar in all respects to racks 108 and 110, connect vessels 104 and 106. A first, upper clamping system 120 is carried by racks 108 and 116, while a second, lower clamping system 122 is connected to and carried by racks 110 and 118. As in the case described above, the clamps 120 and 122 are remotely operated and have pivoting jaws which are pneumatically/hydraulically actuated.

As in the case of the embodiment shown in FIGS. 1-4, there is an air control system for equalizing air pressure in the first, second, and third vessels, and selectively pressurizing or venting air from the vessels. To this end, as seen in FIG. 7, there is an upper conduit 130 providing an open communication path between vessels 104 and 106. A second conduit 132 provides a path for open communication between vessels 102 and 104. There is a control valve 134 connected to conduit 130. Thus, as in the case of the embodiment of FIGS. 1-4, air pressure inside vessels 102, 104, and 106 can be controlled and equalized in conjunction with the use of the remotely operated valving/venting system using valve 134.

Remotely operable compressed air cylinders 140 and 142 can be interconnected to vessels 102 and 104 in a manner similar to that shown with respect to the embodiment of FIG. 1, but preferably are substantially housed on one of the vessels as described with respect to FIGS. 8 and 9.

As was noted above with respect to the embodiment of FIG. 1, there is a free flowing water equalization system which allows ingress and egress of water near the bottom of the vessels. Thus, as seen in FIG. 5, there is a nozzle 150 which is plumbed so as to be connected by suitable piping to all three of the vessels 102, 104, and 106. In other words, the plumbing would be similar to the combination of nozzle 46 and conduit 44 as to the embodiment of FIG. 1 with the exception that the plumbing would connect to all three vessels so that water equalization in all three vessels can be achieved.

As noted, to control buoyancy in vessels 102-106, compressed air cylinders 140 and 142 can be interconnected by suitable plumbing to the interior of all three vessels, in a manner similar to what is seen above with respect to the embodiment of FIG. 1, whereby air pressure in the vessels 102-106 can be remotely controlled by valves connected to compressed air pressure cylinders 140 and 142. In practice, it would be common to use only one compressed air cylinder, e.g., cylinder 140 to pressurize the three vessels 102-106 until the air in cylinder 140 was depleted at which point cylinder 142 could be actuated again by remotely opening the valve connected to compressed air cylinder 142. Further, the air pressure cylinders can be housed in nozzles if required.

As with the embodiment of FIGS. 1-4, the three vessel system shown in FIGS. 5-7 comprises saddles, hatchways, pad eyes, and a platform for purposes described above.

As noted above, one feature of the present invention is the ability to support and facilitate connections of tendons or other elongate structures between sea anchors and floating or semisubmersible platforms.

A feature of the present invention is that when the TSB 100 is oriented as shown in FIG. 7, its width is within the width restrictions (8' 5") of most regulated highways in the United States. Accordingly, it can be transported on a flatbed truck, trailer, or similar vehicles from site to site as needed. In the event that the height of the TSB 100 poses a problem on regulated highways, vessel 102 could be carried disassembled from TSB 100 until the TSB 100 reached the site where the TSB 100 was to be loaded onto a working barge and vessel 102 reconnected.

During deployment, using a work boat, crane and suitable harness assembly, the TSB is suspended from the pad eyes at the top of the vessels in a generally vertical disposition. At this point, the clamping jaws are open and the tendon can be laterally moved into the socket provided by the open jaws, the jaws then being closed, to securely clamp the tendon to the TSB.

To begin deploying the TSB, the air control valve(s) is/are opened allowing the controlled ingress of water and egress of air, permitting the TSB to sink at the desired rate, until it reaches the desired depth to attach the tendon's bottom end to a sea anchor, e.g., a suction pile. Once the tendon is attached to the suction pile, the air control valve(s) is/are closed, and the compressed air cylinder valve is opened to lift the TSB to what is commonly referred to as the TSB's resting elevation. Once this is accomplished, the compressed air cylinder valve is closed.

As can be seen from the above, the TSBs of the present invention can be positioned at a desired depth in the water, and held at that position simply by operating the air equalizing and vent system as described above including the remotely operated compressed air cylinders, the free-flowing wager vent feature allowing the water level to vary in response to the operation of the air equalizer system.

One of the goals of the TSBs of the present invention is to provide a system which requires minimum in-the-water activity, e.g., ROVs, divers, etc. To this end, and as was noted earlier, controls, e.g., valves, compressed air cylinders, etc. are controlled remotely. Generally, this is accomplished by a PLC or modem on a work boat or barge, the PLC including the capability to transmit acoustic signals wirelessly to the TSB systems via a receiver carried by each of the embodiments of FIG. 1 and FIG. 5, preferably as shown in FIG. 9.

Turning now to FIGS. 8 and 9 there is shown one way in which the controllers on board the TSB can be housed so as to be in water tight compartments. It will be understood that the embodiment in FIGS. 8 and 9 need only be on one of the vessels whether it be the embodiment of FIGS. 1-4 or the embodiments of FIG. 5-7.

Referring then to FIGS. 8 and 9 there is shown a modified vessel 104A which would be substituted for vessel 104 in the three vessel embodiment described above. It is to be understood however that one of the vessels in the embodiment of FIG. 1 could also be modified as shown in FIGS. 8 and 9. As best seen in FIG. 9, there are a series of nozzles, three of which 206, 208, and 210 are shown. As can be seen, the nozzles can comprise tubular members which have bolt flanges connected to their upper ends, their being blind flanges connectable to the bolt flanges as seen above. Thus nozzle 206 is provided with a bolt flange 212 to which is bolted a blind flange 214. In like fashion, nozzle 208 is provided with a bolt flange 216 to which is bolted a blind flange 220, and nozzle 210 has a bolt flange 218 to which is bolted a blind flange 222. As can also be seen, central nozzle 208 has a lifting eye 224.

Nozzle 206 extends into and is welded to the top dome of vessel 104A, the lower end of nozzle 206 extending into the interior of vessel 104A. The other nozzles can likewise be welded to the dome of vessel 104A and extend upwardly therefrom. However, they can also extend through the dome of vessel 104A into the interior of vessel 104A if desired. Again, it is the goal of the nozzles to provide water tight "dry space" compartments for the various electronic and pneumatic modules that control the operation of the TSB.

Although in the elevational view of FIG. 9, only three nozzles are shown, it can be seen with reference to FIG. 8 that there are at least six nozzles, center nozzle 208 and five circumferentially spaced nozzles in surrounding relationship to center nozzle 208. Fewer or more nozzles can be used if required to house the control system components in dry space. It can also be seen, particularly from FIG. 8 that center nozzle 208 is connected to each of the surrounding nozzles by conduits C. The conduits C are used to route wiring, cables, tubing, and the like between central nozzle 208 and the peripheral nozzles, e.g., 206, 210, etc.

With respect to nozzle 206, there is a tubular housing 240 having a bolt flange and a blind flange 241 and 242, respectively, disposed in nozzle 206. Disposed in tubular housing 240 is a compressed air cylinder 250, in practice, there being two such cylinders in tubular housing 240, the compressed air cylinders 250 being used in the manner described above with respect to the compressed air cylinders shown in the embodiments of FIGS. 1-7. Further, if necessary the two compressed air cylinders can be in separate nozzles. In other words, rather than having the compressed air cylinders exteriorly mounted to the TSB as shown in FIGS. 1 and 5, they are disposed in the dry space compartments afforded by housing 240 which in turn is in a dry space compartment provided by nozzle 206 as shown with respect to the embodiments of FIG. 1-7.

The other nozzles likewise serve the purpose of providing dry spaces for various other components. Thus, center nozzle 208 can be used to house an acoustic signal receiver and lithium battery while nozzle 210 could be used to house the control system for the compressed air cylinders, e.g., in the cylinder nozzle 206. Still further, the air equalizing system controller could be in one of the other nozzles, a liquid level transmitter in another nozzle and a rotolatch transmitter in yet another nozzle. As noted, conduits C provide closed pathways for electrical cables and instrument tubing needed to connect the various components in the peripheral nozzles to the battery supply and the receiver in the center nozzle 208.

As discussed above, a feature of the TSB of the present invention is that all of the control components needed to operate the TSB and just previously discussed can be operated from a PLC on a work barge, the PLC being operative to send acoustic signals to the receiver in center nozzle 208 which, via connection to the other nozzles can control their various functions, e.g., air ingress and egress, clamp operation, etc.

While the system has been described with respect to tendons, it can also be used with other elongate members such as conductor risers, flowlines, plets, plems, jumpers, manifolds, maritime buoys, and similar suspended members associated with subsea equipment installation, maintenance, and removal.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A buoyancy system, comprising:
    a first buoy comprising a first cylindrical vessel having an upper end and a lower end;
    a second buoy comprising a second cylindrical vessel having an upper end and a lower end, said first and second vessels being generally parallel, and substantially the same dimensionally, said first and second vessels being rigidly interconnected to one another such that said lower ends are about coplanar and said second ends are about coplanar;
    at least one remotely operable clamping system connected to said first and second vessels at a first location, said remotely operable clamping system comprising pivoted jaws;
    a remotely operable air control system for equalizing air pressure in said first and second vessels and selectively pressurizing or venting air from said first and second vessels;
    a water equalizer system operatively connected to said first and second vessels proximate said lower ends thereof, said water equalizer system allowing free-flowing ingress and egress of water in and out of said first and second vessels; and
    a remotely operable source of compressed air connected to said first and second vessels to pressurize said first and second vessels to the desired degree.

2. The buoyancy system of claim 1, wherein there is a second remotely operable clamping system connected to said first and second vessels at a second location axially spaced from said first clamping system, said second remotely operable clamping system comprising pivoted jaws.

3. The buoyancy system of claim 1, wherein said first and second vessels are connected by a web extending between said first and second vessels.

4. The buoyancy system of claim 1, wherein there are a plurality of nozzles connected to the upper end of at least one of said first and second vessels.

5. The buoyancy system of claim 4, wherein at least some of said nozzles extend into said at least one of said first and second vessel.

6. The buoyancy system of claim 4, wherein one of said nozzles is secured to the upper end of said at least one vessel and there is a tubular housing disposed in said one nozzle, said tubular housing extending through the upper end of said at least one vessel.

7. The buoyancy system of claim 6, wherein said source of compressed air comprises compressed air cylinders, and at least one of said cylinders is disposed in said tubular housing.

8. A buoyancy system, comprising:
a first buoy comprising a first cylindrical vessel having an upper end and a lower end;
a second buoy comprising a second cylindrical vessel having an upper end and a lower end;
a third buoy comprising a third cylindrical vessel having an upper end and a lower end, said first, second, and third vessels being generally parallel, substantially the same dimensionally, and rigidly interconnected such that said first ends are about coplanar and said second ends are about coplanar;
at least one remotely operable clamping system connected to said first, second, and third vessels at a first location, said remotely operable clamping system comprising pivoted jaws;
a remotely operable air control system for equalizing air pressure in said first, second, and third vessels and selectively pressurizing or venting air from said first, second and third vessels;
a water level equalizer system operatively connected to said first, second, and third vessels, proximate said lower ends of said vessels, said equalizer system allowing free-flowing ingress and egress of water in and out of said first, second, and third vessels; and
a remotely operable source of compressed air interconnected to said air control system to pressurize said first, second, and third vessels to the desired degree.

9. The buoyancy system of claim 8, wherein there is a second remotely operable clamping system connected to said first, second, and third vessels at a second location axially spaced from said first clamping system, said second remotely operable clamping system comprising pivoted jaws.

10. The buoyancy system of claim 8, wherein said first and second vessels are connected by a first structural rack extending between said first and second vessels, and where said second and third vessels are connected by a second structural rack extending between said first and second vessels.

11. The buoyancy system of claim 8, wherein there are a plurality of nozzles connected to the upper end of at least one of said first, second and third vessels.

12. The buoyancy system of claim 11, wherein one of said nozzles is secured to the upper end of said at least one vessel and there is a tubular housing disposed in said one nozzle, said tubular housing extending through the upper end of said at least one vessel.

13. The buoyancy system of claim 12, wherein said sources of compressed air comprises compressed air cylinders, and at least one of said cylinders is disposed in said tubular housing.

14. The buoyancy system of claim 8, wherein there are a plurality of nozzles connected to the upper end of at least one of said first and second vessels.

15. The buoyancy system of claim 14, wherein one of said nozzles is secured to the upper end of said at least one vessel and there is a tubular housing disposed in said one nozzle, said tubular housing extending through the upper end of said at least one vessel.

16. The buoyancy system of claim 15, wherein said sources of compressed air comprises compressed air cylinders, and at least one of said cylinders is disposed in said tubular housing.

17. A buoyancy system comprising:
a first buoy comprising a cylindrical vessel having an upper end and a lower end;
a remotely operable air control system for selectively pressurizing or venting said vessel;
a static water equalizing vent system connected to said vessel proximate said lower end thereof, said water equalizer vent system allowing free-flowing ingress and egress of water into and out of said vessel;
a remotely operable source of compressed air operatively connected to said air control system; and
a plurality of nozzles connected to the upper end of said cylindrical vessel.

18. The buoyancy system of claim 17, comprising a plurality of said cylindrical vessels;
said air control system being operable to equalize air pressure in said plurality of vessels and selectively pressurize or vent air from said plurality of vessels;
a water equalizer system operatively connected to said plurality of vessels at the lower ends thereof, said water equalizer system allowing free-flowing ingress and egress of water in and out of said plurality of vessels; and
a remotely operable source of compressed air connected to said air control system.

19. The buoyancy system of claim 1, wherein said remotely operable clamping system is controlled by acoustic signals.

20. The buoyancy system of claim 8, wherein said remotely operable clamping system is controlled by acoustic signals.

* * * * *